United States Patent
Chen, Jr. et al.

(10) Patent No.: US 9,747,212 B2
(45) Date of Patent: Aug. 29, 2017

(54) VIRTUAL UNIFED INSTRUCTION AND DATA CACHES INCLUDING STORING PROGRAM INSTRUCTIONS AND MEMORY ADDRESS IN CAM INDICATED BY STORE INSTRUCTION CONTAINING BIT DIRECTLY INDICATING SELF MODIFYING CODE

(71) Applicant: International Business Machines Corporation, Armonk, NY (US)

(72) Inventors: Wen-Tzer Thomas Chen, Jr., Austin, TX (US); Robert H. Bell, Jr., Raleigh, NC (US); Bradly G. Frey, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 13/835,510

(22) Filed: Mar. 15, 2013

(65) Prior Publication Data

US 2014/0281245 A1   Sep. 18, 2014

(51) Int. Cl.
*G06F 12/0846* (2016.01)
(52) U.S. Cl.
CPC ................. *G06F 12/0848* (2013.01)
(58) Field of Classification Search
CPC ............ G06F 2212/451; G06F 2212/452
See application file for complete search history.

(56) References Cited

U.S. PATENT DOCUMENTS

| | | | |
|---|---|---|---|
| 5,201,041 A * | 4/1993 | Bohner et al. ................. | 711/138 |
| 5,471,593 A * | 11/1995 | Branigin ............. | G06F 9/30018 712/219 |
| 5,826,073 A * | 10/1998 | Ben-Meir ........... | G06F 9/30149 712/226 |
| 5,835,949 A * | 11/1998 | Quattromani et al. ....... | 711/135 |
| 5,930,821 A * | 7/1999 | Gaskins et al. ............... | 711/146 |
| 6,341,300 B1 * | 1/2002 | Shankar ................ | G06F 1/0356 708/500 |
| 6,351,797 B1 | 2/2002 | Beard, Sr. et al. | |
| 6,529,862 B1 * | 3/2003 | Mann .................. | G06F 9/45504 703/26 |
| 7,263,585 B2 * | 8/2007 | Hooker ........................ | 711/140 |
| 7,360,028 B1 * | 4/2008 | Tremblay ............ | G06F 9/30043 711/141 |
| 7,426,612 B2 | 9/2008 | Rudd | |
| 7,600,098 B1 * | 10/2009 | Chou ........................... | 712/216 |
| 7,661,023 B2 | 2/2010 | Arora et al. | |
| 8,015,362 B2 | 9/2011 | Alexander et al. | |
| 2011/0138473 A1 | 6/2011 | Yee et al. | |
| 2011/0307662 A1 | 12/2011 | Jacobi et al. | |

* cited by examiner

*Primary Examiner* — Ann J Lo
*Assistant Examiner* — Chie Yew
(74) *Attorney, Agent, or Firm* — DeLizio Law, PLLC (57) ABSTRACT

Execution of a store instruction to modify an instruction at a memory location identified by a memory address is requested. A cache controller stores the memory address and the modified data in an associative memory coupled to a data cache and an instruction cache. In addition, the modified data is stored in a second level cache without invalidating the memory location associated with the instruction cache.

15 Claims, 5 Drawing Sheets

VIRTUAL UNIFED INSTRUCTION AND DATA CACHES INCLUDING STORING PROGRAM INSTRUCTIONS AND MEMORY ADDRESS IN CAM INDICATED BY STORE INSTRUCTION CONTAINING BIT DIRECTLY INDICATING SELF MODIFYING CODE

BACKGROUND

Embodiments of the inventive subject matter generally relate to the field of computer processors, and, more particularly, to a virtual unified instruction and data cache for computer processors.

Caches in many processor architectures include multiple levels of caches. Further, a first level cache may be split into an instruction cache and a data cache. While such split caches can be provide very efficient instruction and data retrieval for a processor, there are cases where a split instruction and data cache can be disadvantageous. One example where split instruction and data caches may be disadvantageous involves self-modifying code. Self modifying code is code that modifies instructions of the currently executing program such that new instructions replace previous instructions in memory. Self-modifying code is typically used to increase execution or memory efficiency of a program. However, use of self-modifying code can, in some cases, actually cause inefficient execution of a program. This is due to the fact that can be a lag between when a memory location containing an instruction is modified and when it is present in the instruction cache and used. In the case of self-modifying code, a memory location must be modified and stored in the data cache. The modified data is then stored to a second level cache, which results in the invalidation of the memory location in the instruction cache. Further, instruction pipelines must typically be flushed before the modified instruction can be used. As a result of the extra cache overhead, execution efficiency may suffer.

SUMMARY

Embodiments include apparatus, method and computer program product implementations that receive a request to execute a store instruction to modify instructions at a memory address. A cache controller stores the memory address and the modified data in an associative memory coupled to a data cache and an instruction cache. In addition, the modified data is stored in a second level cache without invalidating the memory location associated with the instruction cache.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, the examples refer to a cache architecture having a first and second level caches. However, the inventive subject matter can be applied to cache architectures having a single level instruction and data cache and to cache architectures having more the two levels. In other instances, well-known instruction instances, protocols, structures and techniques have not been shown in detail in order not to obfuscate the description.

Generally speaking, the embodiments implement a virtual unified cache by providing a pipeline between a first level data cache and a first level instruction cache. Memory addresses in the pipeline can be detected to allow instruction execution to be stalled until one or more modified instructions in the data cache can be written to the instruction cache. Further, the embodiments provide store instructions that can be used to modify instruction in the data cache without the overhead of back-invalidating the corresponding memory location in the instruction cache.

Figure 1:
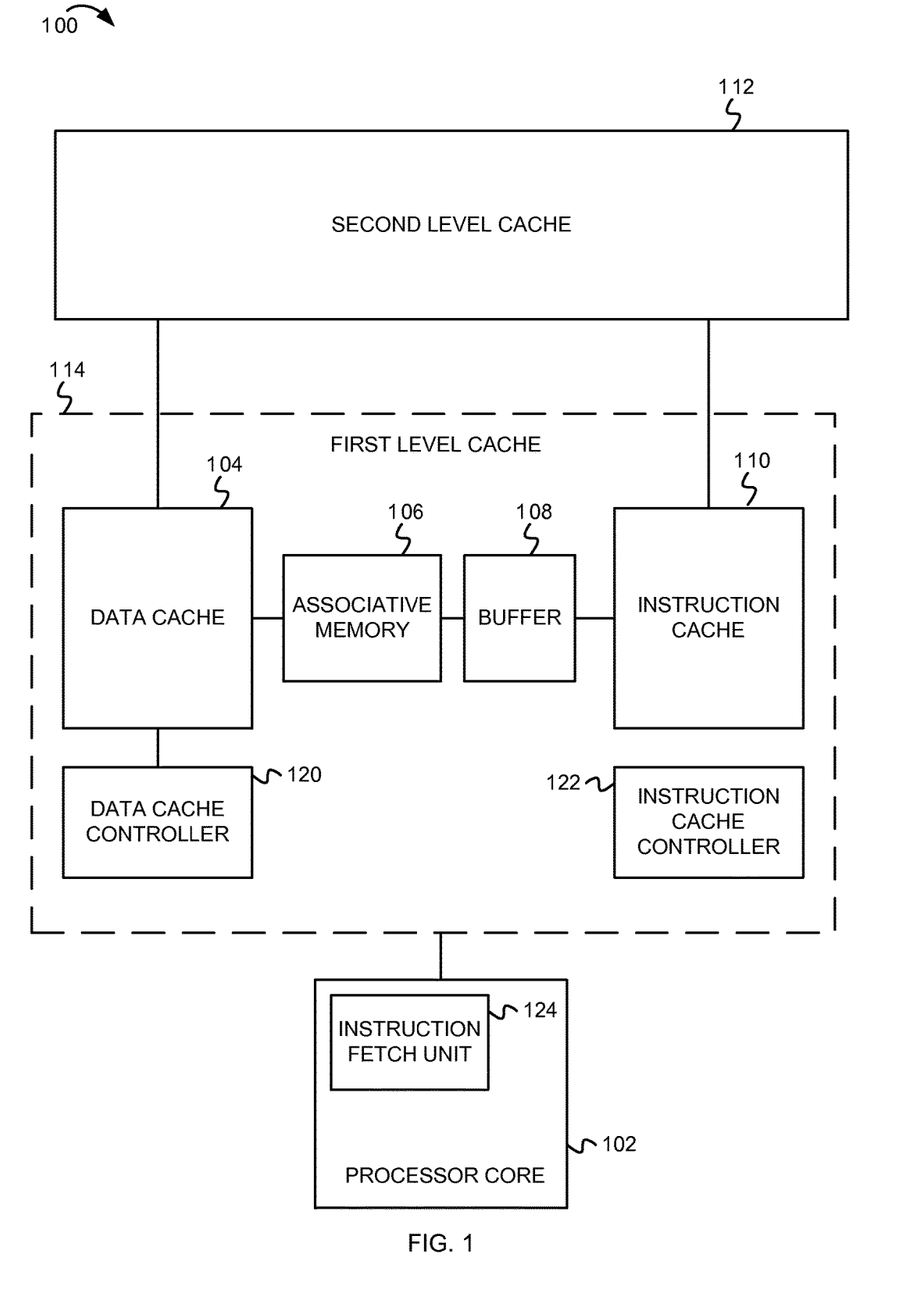
FIG. 1 is a block diagram illustrating a chiplet having a virtual unified cache architecture according to embodiments.

FIG. 1 is a block diagram illustrating a chiplet 100 having a virtual unified cache architecture according to embodiments. Chiplet 100 may be part of a multicore processor. In some embodiments, chiplet 100 includes a processor core 102, a first level cache 114, and a second level cache 112. Processor core 102 implements an instruction set of processor executable instructions. The instruction set may include multiple types of load and store instructions, with each type of load and store instruction having different characteristics as will be described in further detail below. Processor core 102 includes an instruction fetch unit 102 that obtains instructions from memory for execution by processor core 102.

First level cache 114 includes a data cache 104, a data cache controller 120, an instruction cache 110 and an instruction cache controller 122. Instruction cache 110 caches instructions that will potentially be executed by processor core 102, while data cache 104 caches data that may be accessed by processor core 102. Data cache controller 120 and instruction cache controller 122 implement logic that determines entry, exit and invalidation of entries for data cache 104 and instruction cache 110 respectively. It should be noted that the connections between components illustrated in FIG. 1 may be logical paths or physical paths. For example, the path between processor core 102 and first level cache 114 is illustrated as a single logical path. In various implementations, there can be multiple logical and physical paths between the components illustrated in FIG. 1 such as processor core 102, data cache controller 102 and instruction cache controller 104.

Second level cache 112 stores both instructions and data that may be accessed by processor core 102. Second level cache 112 is typically larger than first level cache 114 and can therefore store larger amounts of cached data and instructions than first level cache 114. However, first level cache 114 typically comprises faster memory than second level cache 112 and thus provides instructions and data to processor core 102 faster than second level cache 112.

An associative memory 106 is coupled either directly or indirectly to data cache 104 and instruction cache 110. In some embodiments, associative memory 106 is a content addressable memory (CAM). Associative memory 106 is used in some embodiments to store instructions that have been modified and therefore in data cache 104 prior to be written to instruction cache 110.

In some embodiments, a buffer 108 is optionally present and may be coupled either directly or indirectly between data cache 104 and instruction cache 110. Buffer 108 is used to buffer writes from associative memory 106 to instruction cache 110. In some embodiments, buffer 108 is a first-in first-out (FIFO) buffer. Buffer 108 can have address detection such that an entry in buffer 108 can be invalidated.

In some embodiments, the instruction set for processor core 102 includes two different types of store instructions. A first type of store instruction results in cache operation typical to conventional systems in which a store to a memory location causes the data at the memory location to be cached in second level cache 112. If the memory location was also cached in the first level cache 114, then the first level cache value is invalidated (also known as back-invalidation). Embodiments include a second type of store instruction where back-invalidation is bypassed (i.e., not performed) when data is written to second level cache 112, even if the memory location is present in a first level cache 114.

In a second type of store operation, instructions that are stored in data cache 104 are also stored to associative memory 106 and then written to instruction cache 110. Buffer 108 may be optionally present and is used to buffer writes from associative memory 106 to instruction cache 110. Further details on example caching operations performed within chiplet 100 are provided below with reference to FIGS. 2-5.

Figure 2:
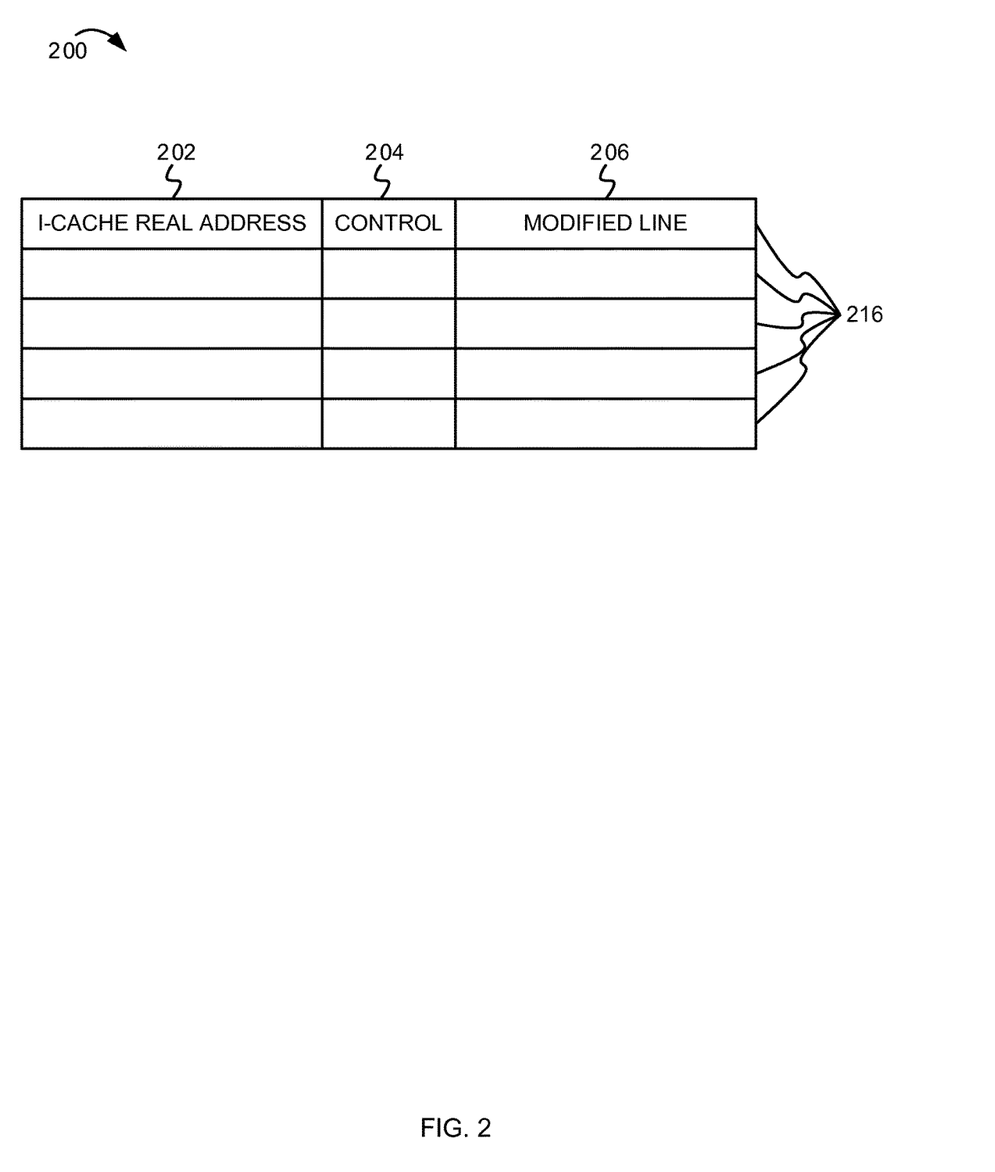
FIG. 2 is a block diagram illustrating a content addressable memory according to embodiments.

FIG. 2 is a diagram illustrating a content addressable memory (CAM) 200 according to embodiments. As noted above, associative memory 106 may be a content addressable memory, such as the CAM 200 illustrated in FIG. 2. CAM 200 is includes multiple lines 216. In some implementations, a line 216 is 128 bytes wide. A line 216 in CAM 200 includes an instruction cache real address 202, control field 204 and modified line 206. Instruction cache real address 202 is the memory address associated with a memory location that is being modified. Modified line 206 is the modified data that is to be stored at the memory location identified by the instruction cache real address 202.

Control field 204 contains indicators that provide information regarding the data in a line 216. In some embodiments, the indicators are bits that include ready bits and valid bits. A ready bit and valid bit may exist for each word in the line. Alternatively, a valid bit or ready bit may apply to the line as a whole. The valid bit is set when a word or line enters CAM 200 indicating that the word is currently valid (i.e., that the line is in use and has valid data). The valid bit can be reset by data cache controller 120 or by another component such as a snooper (not shown) to cancel or invalidate a word or line in CAM 200. A ready bit indicates that the modified line 204 in CAM 200 is ready to be sent to instruction cache 100 at the address indicated by instruction cache real address 204.

Figure 3:
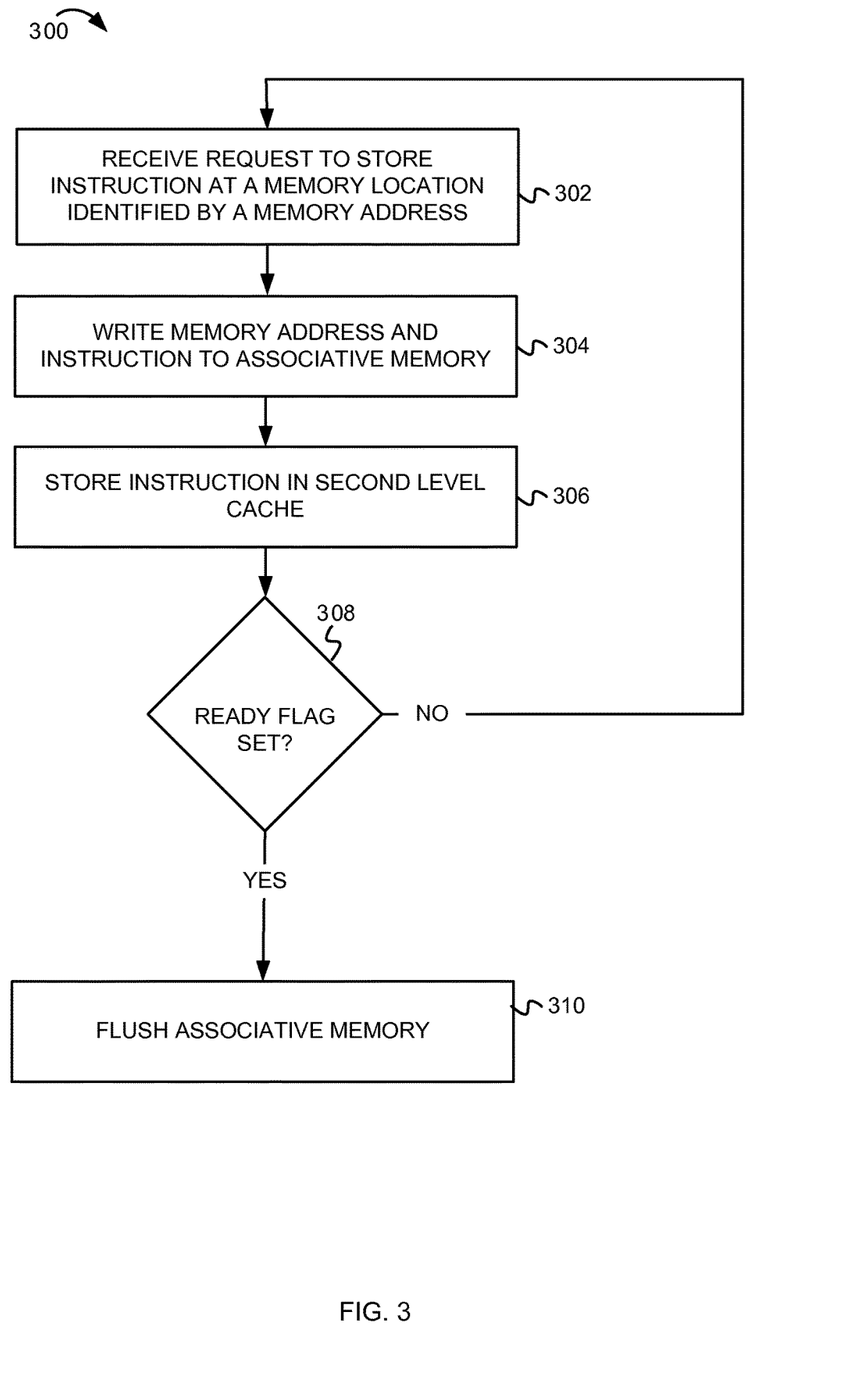
FIG. 3 is a flowchart illustrating a method for storing a modified instruction according to embodiments.

FIG. 3 is a flowchart illustrating a method 300 for storing a modified instruction according to embodiments. Method 300 begins at block 302 by receiving a request to store an instruction at a memory location indicated by memory address. In some embodiments, the request to store an instruction results from the execution of a store instruction, where the instruction to be stored is data referenced by the executed store instruction. The executed store instruction may include information to indicate that the data to be stored at the memory address is actually an instruction (e.g., an instruction generated by a JIT compiler). In some embodiments, the executed store instruction is a modified version of a conventional store instruction for the instruction set for processor 102, with a spare bit in the instruction used to indicate that an instruction is being stored. In particular implementations, the store can be a word oriented store or a line oriented store.

At block 304, the instruction to be stored and the memory address for the instruction to be stored are written to an associative memory such as CAM 200. If the line associated with the memory address for the instruction to be stored is not already in CAM 200, the data cache controller copies the memory address and instruction into the proper position in an empty slot in CAM 200, marks the CAM entry valid, and may copy the rest of the line from the cache into the other positions in the CAM line. Subsequent line-modifying stores that appear may overwrite the entire contents of the CAM 200 line 216 if the real addresses match. In some embodiments, CAM 200 searchable based on the real address, so data cache controller 120 can detect if the line for a store already exists in CAM 200. If CAM 200 is full and does not contain the line, data cache controller 120 can wait. Wait times can be mitigated by moving completed entries to buffer 108 that sends data stored in the buffer in the order received to instruction cache 110. In such implementations, it is desirable to provide address collision detection on CAM 200 and buffer 108. In some embodiments, collision detection can be used to indicate that CAM 200 or buffer 108 holds data for an instruction fetch. For example, during an instruction cache directory access, a check can be made to determine if the desired address is in CAM 200 or buffer 108. If the desired address is in CAM 200 or buffer 108, determination of a collision can be used to indicate that updated data is available in CAM 200 or buffer 108 and the updated data can be returned to the instruction fetch unit. In alternative embodiments, collision detection can be used to allow back invalidation from second level cache 112 and instruction cache 110 in the case of instruction cache fetch collisions.

At block 306, in some implementations the data cache controller sees the bit set on the store, and sends the store to the second level cache 112 for insertion inclusivity.

At block 308, the data cache controller determines if the ready bit is set for the line. If the ready bit is not set, then the method may return to block 302 to await reception of further requests to store instructions in memory. The ready bit may be set in various ways. For example, in some embodiments where a store instruction indicates that an instruction is being modified, a bit in the store instruction may be set to indicate that the ready bit should be set in CAM 200. For example, when the last instruction of a block of self-modified code has been written, a just-in-time compiler can use the store instruction to cause the ready bit to be set indicating that the block of self-modified code is ready for execution. In alternative embodiments, the associative memory (e.g., CAM 200) or buffer has mark bits to tell what parts of the line hold updates. The ready bit can be set if the mark bits for an entire line are set. In further alternative embodiments where the entire line is not stored, cache controller 120 may implement a rule that detects whether a currently executing store instruction is modifying an instruction at an address that is adjacent to an address that was modified by a previously executed store instruction. If the cache controller 120 detects that there is an end to the sequential stores (e.g., the store is for a non-adjacent address) and the ready bit isn't set, the cache controller sets the ready bit for the previously modified instructions.

If the ready bit is set, then at block 310, the line is flushed from CAM 200 to instruction cache 110. In embodiments where buffer 108 is present, the line may be written to buffer 108 prior to insertion into instruction cache 110. In some embodiments, parts of a line in the associative memory that have mark bits set indicating that the part of the line has been updated are written to the instruction cache. Those parts of the line (if any) not having a mark bit set are not written.

The logic for instruction cache 110 (e.g., instruction cache controller 122) takes items in order from buffer 108 and stores the line into the instruction cache 110. In some embodiments, a line from buffer 108 (or CAM 200) may be broken into four 32 byte chunks which are written sequentially to instruction cache 110. These chunks can be kept in order to keep line processing in instruction cache 110 in order.

Operations 302-310 described above are performed without invalidating the first level instruction cache 110. This is contrary to conventional implementations of store instruction, where the first level instruction cache entry is invalidated upon a write of an instruction at the same read address to a data cache (e.g., by self-modifying code).

In some embodiments where full-line stores are implemented, the CAM 200 is not present, and the operations described above may be performed using buffer 108.

It should be noted that operations in the above flow chart may be performed in alternative orders. For example, operations associated with blocks 304 and 306 may be performed either simultaneously or in the opposite order indicated in method 300.

Figure 4:
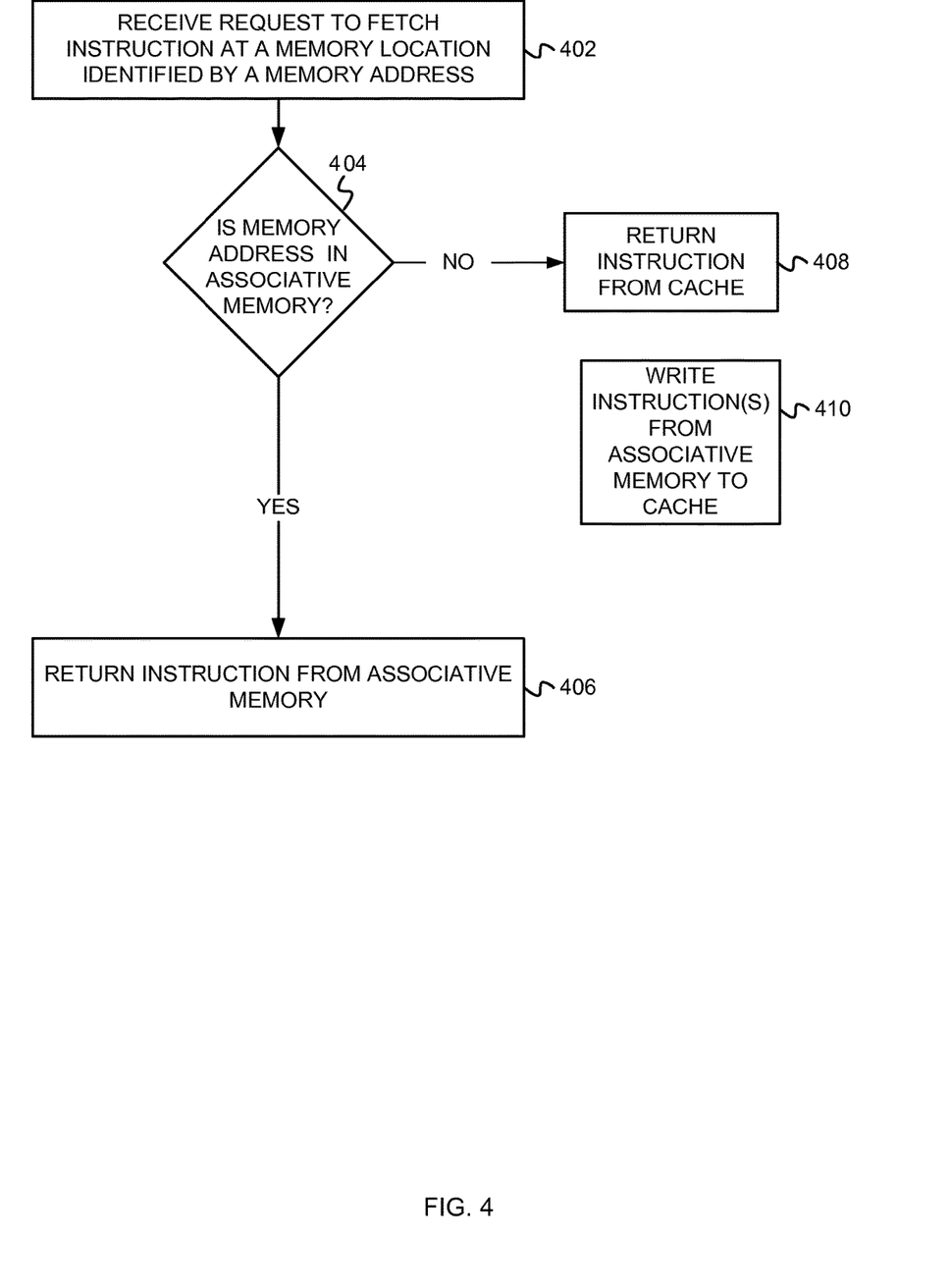
FIG. 4 is a flowchart illustrating a method for fetching an instruction according to embodiments.

FIG. 4 is a flowchart illustrating a method 400 for fetching an instruction according to embodiments. Method 400 begins at block 402 with receiving a request to fetch an instruction identified by a memory address.

At block 404, a check is made to determine if the memory address is in an associative memory (e.g., CAM 200) in a pipeline between data cache 104 and instruction cache 110. If the address is not in the associative memory, then at block 408, the method returns the instruction from the instruction cache. If the instruction is not in the instruction cache, the instruction may be retrieved from a second level cache or from memory.

If the check at block 404 determines that the memory address is in the associative memory, then in some embodiments, at block 406 cache controller 120 protects the instruction from fetches that would otherwise fetch instructions from the second level cache by returning the instruction in the associative memory to the requesting instruction fetch unit. In such embodiments, the instruction can be returned without waiting for the line to be written to the instruction cache. In alternative embodiments, cache controller 120 protects the instruction from fetches. In such alternative embodiments, protecting the instruction from fetches may include stalling an instruction execution pipeline.

Block 410 represents a free running set of operations where one or more instructions in the associative memory are written to instruction cache 110. The operations in block 410 can be asynchronous to the instruction fetching process. In some embodiments, this may be in response to setting a ready bit associated with the line in associative memory 106 containing the instruction. The oldest "ready" buffer (or associative memory element) can be written to instruction cache 110 and removed from the buffer 108 or associative memory 106 whenever a write port to instruction cache 110 is available.

At block 410, the instruction at the requested memory address is returned from instruction cache 110.

It should be noted that although the discussion above has been presented in the context of an operating environment where a specialized store instruction is used to indicate that the above-described caching operations are to performed, alternative embodiments do not use a specialized store instruction that indicates an instruction is being stored. For example, in some alternative embodiments, a store instruction can cause the cache controller to interrogate a first level instruction cache directory to determine if the line is already in the instruction cache. If the line is already in the instruction cache, then the modified data for the line may be written to the associative memory and back-invalidation may be bypassed as discussed above. If the line is not already in the cache, then conventional cache operations may be performed.

In further alternative embodiments, all store instructions are processed through CAM 200. The instruction cache 110 is checked when the line is ready to be written from CAM 200 to instruction cache 110.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
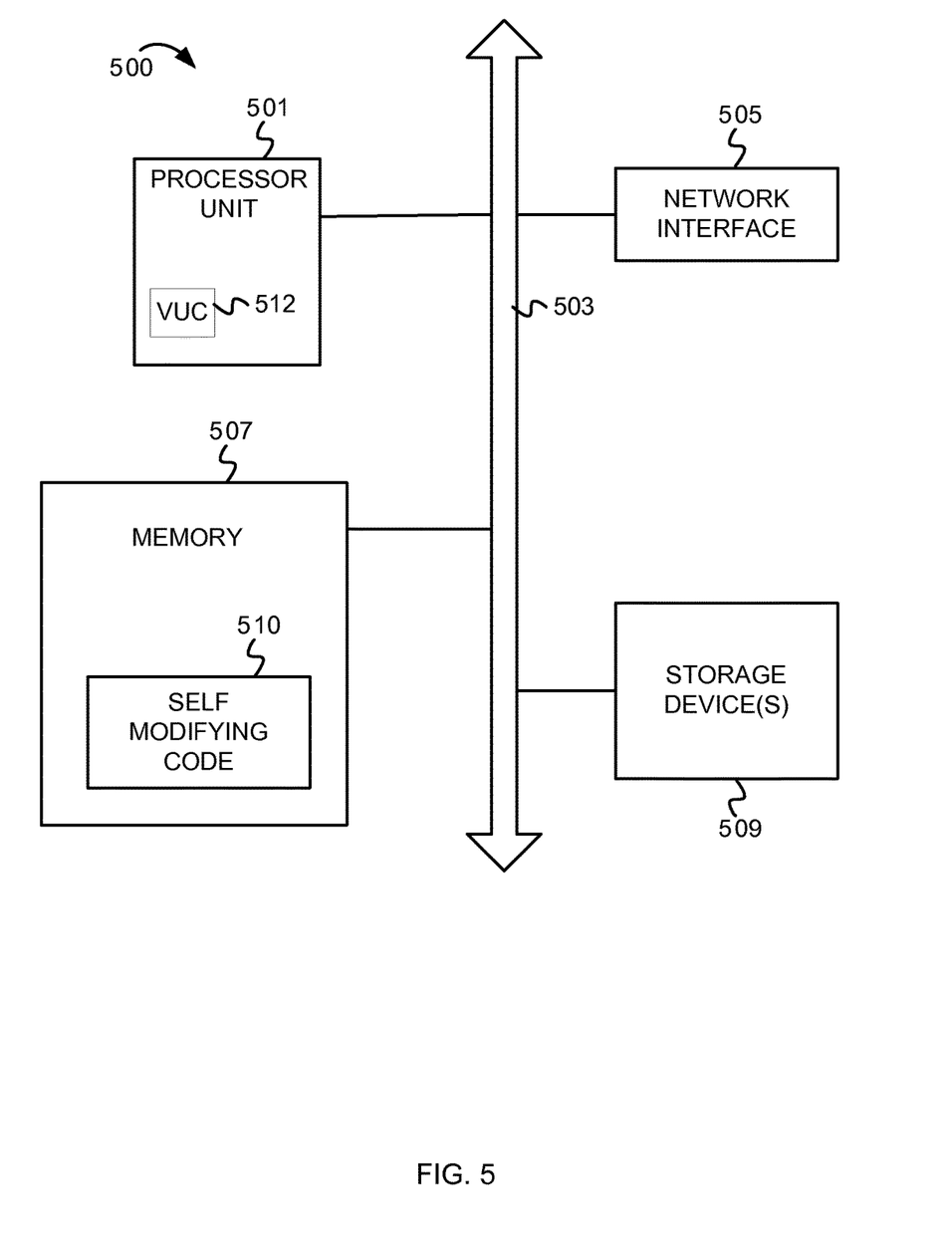
FIG. 5 is a block diagram illustrating a system incorporating a virtual unified cache architecture.

FIG. 5 is a block diagram illustrating a computer system 500 incorporating embodiments of the inventive subject matter. A computer system includes a processor unit 501 (possibly including multiple processors, multiple cores, multiple nodes, and/or implementing multi-threading, etc.). Processor 501 embodies functionality to implement embodiments described above. For example, processor 501 may implement, within cache controllers on processor 501, a virtual unified cache 512 comprising a pipeline between a data cache and an instruction cache on the processor. The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport®, InfiniBand®, NuBus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The system memory 507 may include self modifying code 510, for example, code produced by a just-in-time compiler. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

While the embodiments are described with reference to various implementations and exploitations, it will be understood that these embodiments are illustrative and that the scope of the inventive subject matter is not limited to them. In general, techniques for providing a virtual unified level on cache comprising a pipeline between a data cache and an instruction cache as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for modifying program instructions comprising:

receiving a request to execute a store instruction to modify first data at a memory location identified by a memory address;

determining that one or more bits of the store instruction are set to directly indicate that second data referenced by the store instruction comprises a program instruction to replace the first data;

in response to determining that the one or more bits of the store instruction are set to directly indicate that the second data referenced by the store instruction comprises the program instruction, storing a first instruction cache memory address and the program instruction in an associative memory pipeline coupled between a data cache and an instruction cache, wherein a first level cache comprises the data cache, the instruction cache, and the associative memory pipeline;

receiving a fetch request specifying a second instruction cache memory address;

in response to receiving the fetch request, determining if the second instruction cache memory address matches the first instruction cache memory address; and in response to determining that the second instruction cache memory address matches the first instruction cache memory address, protecting an instruction cache entry associated with the second instruction cache memory address from instruction fetches until the program instruction is written to the instruction cache.

2. The method of claim 1, wherein protecting the instruction cache entry associated with the second instruction cache memory address from instruction fetches includes stalling an instruction pipeline.

3. The method of claim 1, further comprising:
in response to the determining that the second instruction cache memory address matches the first instruction cache memory address, returning the program instruction for the second instruction cache memory address from the associative memory pipeline.

4. The method of claim 1, wherein said storing the first instruction cache memory address and the program instruction in the associative memory pipeline coupled between the data cache and the instruction cache is performed without invalidating the instruction cache.

5. An apparatus comprising:
a first level cache comprising:
a data cache;
an instruction cache;
one or more cache controllers coupled to the data cache and the instruction cache;
and an associative memory coupled between the data cache and the instruction cache, the associative memory comprising a real address field and a modified line field;
wherein the one or more cache controllers are configured to:
receive a request to execute a store instruction to modify first data at a memory location identified by a memory address,
determine that one or more bits of the store instruction are set to directly indicate that second data referenced by the store instruction comprises a program instruction to replace the first data,
in response to determining that the one or more bits of the store instruction are set to directly indicate that the second data referenced by the store instruction comprises the program instruction, store a first instruction cache memory address and the program instruction in the associative memory,
receive a fetch request specifying a second instruction cache memory address,
in response to receipt of the fetch request, determine if the second instruction cache memory address matches the first instruction cache memory address, and in response to a determination that the second instruction cache memory address matches the first instruction cache memory address, protect an instruction cache entry associated with the second instruction cache memory address from instruction fetches until the program instruction is written to the instruction cache; and a second level cache coupled to the first level cache.

6. The apparatus of claim 5, wherein the associative memory includes a content addressable memory.

7. The apparatus of claim 5, wherein the associative memory includes a valid indicator field.

8. The apparatus of claim 5, wherein the associative memory includes a ready indicator field.

9. The apparatus of claim 5, further comprising a buffer coupled between the associative memory and the instruction cache.

10. The apparatus of claim 9, wherein the buffer is a first-in first-out buffer.

11. The apparatus of claim 5, wherein the one or more cache controllers are further configured to store the first instruction cache memory address and the program instruction in the associative memory without invalidating the instruction cache.

12. A computer program product for caching instructions, the computer program product comprising:
a non-transitory computer readable storage medium having computer usable program code embodied therewith, the computer usable program code comprising a computer usable program code configured to:
receive a request to execute a store instruction to modify first data at a memory location identified by a memory address;
determine that one or more bits of the store instruction are set to directly indicate that second data referenced by the store instruction comprises a program instruction to replace the first data;
in response to determining that the one or more bits of the store instruction are set to directly indicate that the second data referenced by the store instruction comprises the program instruction, store a first instruction cache memory address and the program instruction in an associative memory pipeline coupled between a data cache and an instruction cache, wherein a first level cache comprises the data cache, the instruction cache, and the associative memory pipeline;
receive a fetch request specifying a second instruction cache memory address;
in response to receipt of the fetch request, determine if the second instruction cache memory address matches the first instruction cache memory address, and
in response to a determination that the second instruction cache memory address matches the first instruction cache memory address, protect an instruction cache entry associated with the second instruction cache memory address from instruction fetches until the program instruction is written to the instruction cache.

13. The computer program product of claim 12, wherein the computer usable program code configured to protect the instruction cache entry associated with the second instruction cache memory address from instruction fetches includes computer usable program code configured to stall an instruction pipeline.

14. The computer program product of claim 12, wherein the computer usable program code is further configured to:
in response to the determination that the second instruction cache memory address matches the first instruction cache memory address, return the program instruction for the second instruction cache memory address from the associative memory pipeline.

15. The computer program product of claim 12, wherein the computer usable program code configured to store the first instruction cache memory address and the program instruction in the associative memory pipeline is performed without invalidating the instruction cache.

* * * * *